United States Patent
Ramaraj

(10) Patent No.: US 10,645,437 B2
(45) Date of Patent: May 5, 2020

(54) SYSTEMS AND METHODS FOR ACHIEVING OPTIMAL NETWORK BITRATE

(71) Applicant: SLING MEDIA PVT LTD, Bangalore (IN)

(72) Inventor: Jayaprakash Narayanan Ramaraj, Bengaluru (IN)

(73) Assignee: SLING MEDIA PVT LTD, Bangalore (IN)

(*) Notice: Subject to any disclaimer, the term of this patent is extended or adjusted under 35 U.S.C. 154(b) by 39 days.

(21) Appl. No.: 15/613,779

(22) Filed: Jun. 5, 2017

(65) Prior Publication Data
US 2018/0288459 A1    Oct. 4, 2018

(30) Foreign Application Priority Data
Apr. 3, 2017   (IN) .............................. 201741012018

(51) Int. Cl.
| | |
|---|---|
| *H04N 21/2343* | (2011.01) |
| *H04N 21/2662* | (2011.01) |
| *H04N 21/236* | (2011.01) |
| *H04L 5/00* | (2006.01) |
| *H04L 29/06* | (2006.01) |
| *H04N 21/6379* | (2011.01) |
| *H04L 29/12* | (2006.01) |

(52) U.S. Cl.
CPC ....... *H04N 21/2662* (2013.01); *H04L 5/0055* (2013.01); *H04L 65/1069* (2013.01); *H04L 65/602* (2013.01); *H04L 65/607* (2013.01); *H04L 69/16* (2013.01); *H04N 21/236* (2013.01); *H04N 21/6379* (2013.01)

(58) Field of Classification Search
None
See application file for complete search history.

(56) References Cited

U.S. PATENT DOCUMENTS

| | | | |
|---|---|---|---|
| 2001/0032269 A1* | 10/2001 | Wilson ..................... | H04L 47/10 709/235 |
| 2009/0103607 A1* | 4/2009 | Bajpai .............. | H04N 21/23406 375/240.02 |
| 2009/0254657 A1 | 10/2009 | Melnyk et al. | |
| 2011/0122880 A1* | 5/2011 | Saito ................. | H04L 29/12367 370/401 |
| 2011/0283014 A1* | 11/2011 | Malik ..................... | H04L 47/10 709/233 |

(Continued)

OTHER PUBLICATIONS

International Searching Authority, International Search Report for International Patent Application PCT/IN2018/050188, dated Jul. 12, 2018.

*Primary Examiner* — Hsiungfei Peng
*Assistant Examiner* — Terrika Peterson
(74) *Attorney, Agent, or Firm* — Lorenz & Kopf LLP

(57) ABSTRACT

A method of encoding packets of a media stream includes establishing a data connection between a client device and a server, sending a first packet of the media stream from the server to the client device at a first bit rate, receiving, at the server, a first acknowledgment signal from the client device responsive to receipt of the first packet, determining a second bit rate based on the first acknowledgment signal, and sending a second packet of the media stream from the server to the client at the second bit rate.

17 Claims, 3 Drawing Sheets

(56) References Cited

U.S. PATENT DOCUMENTS

| | | | |
|---|---|---|---|
| 2014/0286438 A1* | 9/2014 | Apte | H04N 21/2343 |
| | | | 375/240.26 |
| 2014/0297813 A1* | 10/2014 | Gomes | H04N 19/196 |
| | | | 709/219 |
| 2016/0205164 A1 | 7/2016 | Schmidt et al. | |
| 2018/0167436 A1* | 6/2018 | Han | H04L 43/0858 |
| 2018/0176615 A1* | 6/2018 | Hannu | H04N 21/222 |

\* cited by examiner

SYSTEMS AND METHODS FOR ACHIEVING OPTIMAL NETWORK BITRATE

CROSS-REFERENCE TO RELATED APPLICATIONS

This application claims priority to Indian Provisional Patent Application Number 201741012018, filed Apr. 3, 2017, the contents of which are hereby incorporated by reference.

TECHNICAL FIELD

The present disclosure generally relates to techniques for controlling the encoding bitrate of a segmented bitstream, such as a media stream in HTML 5, HLS, or a similar format, that is transmitted over a data connection.

BACKGROUND

Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

While placeshifting does greatly improve the convenience afforded to the viewer, challenges can arise in effectively creating and transmitting the encoded media stream. The variety of network environments (e.g., LAN, WAN, Internet, wireless telephone, etc.) that may be supported can lead to significant variations in encoding parameters over time. Moreover, digital networks, particularly those based on Ethernet and/or TCP/IP-type protocols, are inherently unpredictable, and network conditions can change rapidly even while the media stream is being transmitted. Furthermore, while various methods exist for arriving at an optimal bitrate selection for communication between a client and a server in such environments, such methods are typically slow in converging to such a bitrate.

It is therefore desirable to create systems and methods for achieving optimal bitrate in a network environment. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary system for encoding segmented media streams;

DETAILED DESCRIPTION

Figure 1:
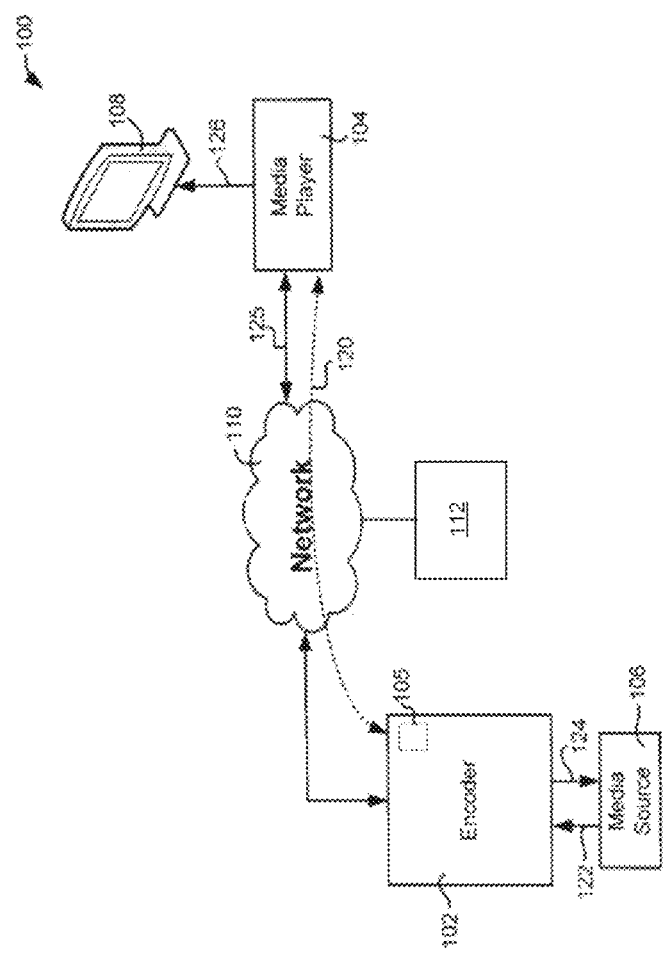

The following detailed description of the invention is merely exemplary in nature and is not intended to limit the invention or the application and uses of the invention. Furthermore, there is no intention to be bound by any theory presented in the preceding background or the following detailed description.

According to various embodiments, the efficiency and effectiveness of media stream encoding, particularly the bitrate selected for transmission of packets from a server to a client, can be greatly improved in real time by considering timing information based on a TCP/IP ACK signal (simply referred to herein as an "ACK") received from a client. In one embodiment, for example, the server determines the time required to receive an ACK in response to a sent packet and, knowing the number of bytes received by the client (e.g., the "size" of the packet, as determined by the ACK sequence number) as well as the length of time between when the packet was sent and when the ACK was received, computes an estimated optimal bitrate for the connection—e.g., by dividing the packet size by the time necessary to receive the ACK. Subsequently, the bitrate is adjusted accordingly. It has been found that such a method greatly increases the speed at which the server arrives at an optimal bitrate.

By way of background, in many placeshifting situations it is often desirable (if not necessary) to encode the media stream in relative real time as the content is received. If the user wishes to view a live television program, for example, signals representing the program are typically encoded (or transcoded) into network-transmittable format as the signal is received by the encoder. Even if the viewer is watching a media stream based upon previously-stored content (e.g., a program stored on a DVR or similar media), the encoder typically creates the network-routable stream at the same time that the stream is transmitted to the viewer. One disadvantage of real-time encoding is that sufficient computing and transmitting resources must be available to maintain the real-time stream, or the viewer's experience can be degraded.

On the other hand, real-time encoding allows the encoding to be adjusted to compensate for variations in network conditions, user preferences, and other factors that may arise. Encoding may be adjusted upwardly or downwardly, for example, to compensate for bandwidth fluctuations or differences in player capabilities. That is, a media stream with a lower bit rate, frame rate and/or resolution can be provided when the client capabilities or network are only able to support the lower quality stream, while maintaining the capability to deliver a higher quality (but higher bandwidth) stream as conditions allow. One example of such a system is described in US Patent Publication No. 2009/0103607. In that example, the utilization of the transmit buffer in the placeshifting device can be used as an estimate of network bandwidth, and encoder quality can be adjusted accordingly.

During a streaming session in which the client synchronously requests segments of a media stream from a server, further adjustments may be made to compensate for segment delivery times and/or other temporal factors. If no client request is active during a synchronous time period, for example, then unused bandwidth may be available. Bandwidth may also be available when a particular request is delayed due to network latency or other factors. In either of these cases, a quality scheme that only considers network bandwidth may improperly conclude that stream quality should be upgraded to take advantage of available bandwidth. When subsequent requests arrive, however, this situation may create a bottleneck if the bandwidth to accommodate the quality upgrade is not in fact available. Other implementations that only consider bandwidth could improperly conclude that stream quality should be downgraded under similar conditions because buffer occupancy will typically increase if there is no request, or if the request is delayed.

Moreover, it may be desirable in some situations to adjust the encoding to compensate for transmission delays even if bandwidth conditions might dictate that no adjustment is otherwise necessary. A high bandwidth but low latency data connection could justify lower encoding quality than would otherwise be available to ensure sufficient round-trip transit times for segment requests and segment deliveries to the client. Still further, there may be situations in which the transmit buffer is filled for reasons unrelated to available bandwidth. As noted above, the buffer may fill because no recent request has been received. In this situation, it may be desirable to simply maintain current encoding parameters rather than "downshifting" or degrading the quality of the media stream while waiting for subsequent requests to arrive, so long as the buffer is not in danger of overflowing.

It is therefore desirable to adapt the encoding of the media stream with consideration to the request-response nature of some streaming techniques. Parameters that may be considered could include, in various embodiments, the time taken to send one or more segments in the data connection, the throughput achieved during active segment sends in the data connection, the transmit buffer occupancy in terms of duration at periodic intervals (or the like), and/or other factors as appropriate. Additional detail of an exemplary embodiment is provided below.

Turning now to the drawing figures and with initial reference to FIG. 1, an exemplary placeshifting system 100 suitably includes a placeshifting encoder system 102 that receives media content 122 from a content source 106, encodes the received content into a streaming format that includes multiple segments, and then transmits the segments of encoded media stream 120 to a media player 104 over network 110. The media player 104 suitably receives the encoded stream 120, decodes the stream, and presents the decoded content to a viewer on a television or other display 108. In various embodiments, a server 112 may also be provided to communicate with encoder system 102 and/or player 104 via network 110 to assist these devices in locating each other, maintaining security, providing or receiving content or information, and/or any other features as desired. This feature is not required in all embodiments, however, and the concepts described herein may be deployed in any data streaming application or environment, including placeshifting but also any other media or other data streaming situation.

Placeshifting encoder system 102 is any component, hardware, software logic and/or the like capable of transmitting a packetized stream of media content over network 110. In various embodiments, placeshifting device 102 incorporates suitable encoder and/or transcoder (collectively "encoder") logic to convert audio/video or other media data 122 into a packetized format that can be transmitted over network 110. The media data 122 may be received in any format, and may be received from any internal or external source 106 such as any sort of broadcast, cable or satellite television programming source, a "video-on-demand" or similar source, a digital video disk (DVD) or other removable media, a video camera, and/or the like. Encoder system 102 encodes media data 122 to create media stream 120 in any manner. In various embodiments, encoder system 102 contains a transmit buffer 105 that temporarily stores encoded data prior to transmission on network 110. As buffer 105 fills or empties, one or more parameters of the encoding (e.g., the bit rate of media stream 120) may be adjusted to maintain desirable picture quality and data throughput in view of the then-current network performance. As described more fully below, various embodiments are able to calculate a current encoding bitrate based upon network transfer rate, times to transmit segments, and/or other factors, and to adjust the encoding rate as changing conditions warrant. Changes in the encoding parameters may be triggered by, for example, changes in the utilization of the outgoing buffer 105 or changes in segment transit times, as desired.

Several examples of encoding systems 102 may be implemented using any of the various SLINGBOX products available from Sling Media of Foster City, Calif., although other products could be used in other embodiments. Many different types of encoder systems 102 are generally capable of receiving media content 122 from an external source 106 such as any sort of digital video recorder (DVR), set top box (STB), cable or satellite programming source, DVD player, and/or the like. In such embodiments, encoder system 102 may additionally provide commands 124 to the source 106 to produce desired signals 122. Such commands 124 may be provided over any sort of wired or wireless interface, such as an infrared or other wireless transmitter that emulates remote control commands receivable by the source 106. Other embodiments, however, particularly those that do not involve placeshifting, may modify or omit this feature entirely.

In other embodiments, encoder system 102 may be integrated with any sort of content receiving or other capabilities typically affiliated with source 106. Encoder system 102 may be a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote player 104 as appropriate. Such devices 102 may also include a content database stored on a hard disk drive, memory, or other storage medium to support a personal or digital video recorder (DVR) feature or other content library as appropriate. Hence, in some embodiments, source 106 and encoder system 102 may be physically and/or logically contained within a common component, housing or chassis.

In still other embodiments, encoder system 102 is a software program, applet or the like executing on a conventional computing system (e.g., a personal computer). In such embodiments, encoder system 102 may encode, for example, some or all of a screen display typically provided to a user of the computing system for placeshifting to a remote location. One device capable of providing such functionality is the SlingProjector product available from Sling Media of Foster City, Calif., which executes on a conventional personal computer, although other products could be used as well.

Media player 104 is any device, component, module, hardware, software and/or the like capable of receiving a media stream 120 from one or more encoder systems 102. In various embodiments, remote player 104 is personal computer (e.g., a "laptop" or similarly portable computer, although desktop-type computers could also be used), a mobile phone, a personal digital assistant, a personal media player or the like. In many embodiments, remote player 104 is a general purpose computing device that includes a media player application in software or firmware that is capable of securely connecting to placeshifting encoder system 102, as described more fully below, and of receiving and presenting media content to the user of the device as appropriate. In other embodiments, however, media player 104 is a standalone or other separate hardware device capable of receiving the media stream 120 via any portion of network 110 and decoding the media stream 120 to provide an output signal 126 that is presented on a television or other display 108. One example of a standalone media receiver 104 is the SLINGCATCHER product available from Sling Media of Foster City, Calif., although other products could be equivalently used.

Network 110 is any digital or other communications network capable of transmitting messages between senders (e.g., encoder system 102) and receivers (e.g., receiver 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

Encoder system 102 and/or player 104 are therefore able to communicate with player 104 in any manner (e.g., using any sort of data connections 128 and/or 125, respectively). Such communication may take place over a wide area link that includes the Internet and/or a telephone network, for example; in other embodiments, communications between devices 102 and 104 may take place over one or more wired or wireless local area links that are conceptually incorporated within network 110. In various equivalent embodiments, encoder system 102 and receiver 104 may be directly connected via any sort of cable (e.g., an Ethernet cable or the like) with little or no other network functionality provided.

Many different placeshifting scenarios could be formulated based upon available computing and communications resources, consumer demand and/or any other factors. In various embodiments, consumers may wish to placeshift content within a home, office or other structure, such as from a placeshifting encoder system 102 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote player 104 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, any sort of 3G, 4G or subsequent telephone link, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

Encoder system 102, then, generally creates a media stream 120 that is routable on network 110 based upon content 122 received from media source 106. As noted above, the media stream delivered to the client can be split into individual segments that may be transmittable in a file-based scheme (e.g., HTML or the like) for delivery to media client 104. Each segment may represent any duration of the video content, and segments may be individually encoded from the input signal 122 using any appropriate parameters, as described more fully below. In an exemplary embodiment, segments may represent portions of the content on the order of one or more milliseconds or so, although other embodiments could use segments of any duration, including segments lasting on the order of a second or more. Each segment is then transmitted as part of media stream 120 in response to a request for the segment that is received from the client 104. Requests may be received via a control connection (e.g., connection 125 in FIG. 1) or the like; in some embodiments, requests may simply be HTTP "GET"-type instructions or similar HTML-5 structures that request the particular segment of stream 120. As bandwidth and/or segment transmit time changes, the encoding and transmission bitrate of future segments can be appropriately modified as desired.

The various modules depicted in the drawings and/or described herein may be implemented in software or firmware residing in any memory, mass storage or other storage medium within encoder system 102 in source code, object code and/or any other format. Such features may be executed on any sort of processor or microcontroller executing within encoder system 102. In various embodiments, encoder system 102 is implemented as a system on a chip (SoC) type system with integrated processing, storage and input/output features. Various SoC hardware implementations are available from Texas Instruments, Conexant Systems, Broadcom Inc., and other suppliers as appropriate. Other embodiments may use any number of discrete and/or integrated processing components, memories, input/output features and/or other features as desired.

Figure 2:
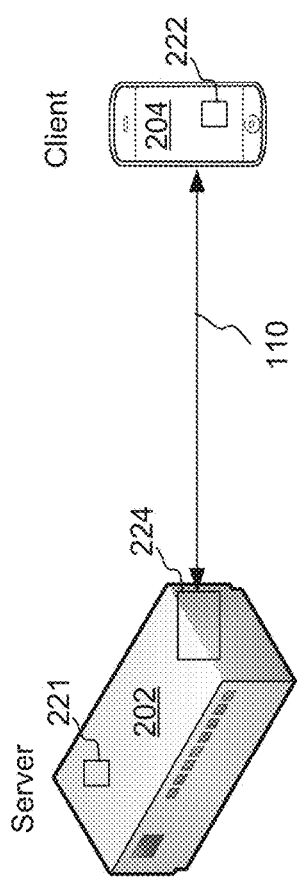
FIG. 2 is a block diagram of an communication paradigm in which the present subject matter may be employed.

As noted above, creating a media stream 120 typically involves encoding and/or transcoding an input media stream 122 received from an internal or external media source 106 into segments or another suitable digital format that can be transmitted on network 110. Generally, the media stream 120 is placed into a standard or other known format (e.g., the WINDOWS MEDIA format available from the Microsoft Corporation of Redmond, Wash. although other formats such as the FLASH format, QUICKTIME format, REAL-PLAYER format, MPEG-2/MPEG-4 format, and/or the like could be used in any other embodiments) that can be transmitted on network 110. This encoding may take place, for example, in any sort of encoding module 202 as appropriate. Encoding module 202 may be any sort of hardware (e.g., a digital signal processor or other integrated circuit used for media encoding), software (e.g., software or firmware programming used for media encoding that executes on the SoC or other processor described above), or the like. Encoding module 202 is therefore any feature that receives media data 122 from the internal or external source 106 (e.g., via any sort of hardware and/or software interface) and encodes or transcodes the received data into the desired format for transmission on network 110. Although FIG. 2 shows a single encoding module 202, in practice system 102 may include any number of encoding modules 202. Different encoding modules 202 may be selected based upon preference of player 104, network conditions, and/or the like.

In various embodiments, encoder 202 may also apply other modifications, transforms and/or filters to the received content before or during the transcoding process. Video signals, for example, may be resized, cropped and/or skewed. Similarly, the color, hue and/or saturation of the signal may be altered, and/or noise reduction or other filtering may be applied. Audio signals may be modified by adjusting volume, sampling rate, mono/stereo parameters, noise reduction, multi-channel sound parameters and/or the like. Digital rights management encoding and/or decoding may also be applied in some embodiments, and/or other features may be applied as desired.

As noted above, one or more parameters of the encoding process (e.g., the bit rate, frame rate, image resolution and/or other parameters) may be adjusted during the encoding process to produce a media stream 120 that is modified or tuned to the then-current conditions of network 110 and/or media player 104. The encoding bit rate, for example, can be adjusted in response to a measured capability of network 110 and/or segment transmit times, as desired. That is, bit rate may be increased when conditions are able to accommodate the higher rate; conversely, bit rate can be decreased when conditions are less able to accommodate the greater demands. By adjusting the bit rate of the encoding process in response to the network performance, the user experience can be greatly improved in real time. Equivalent embodiments may adjust the frame rate, resolution and/or other parameters in addition to or in place of the bitrate, as appropriate.

FIG. 2 depicts, in simplified form, communication via a server 202 and a client 204 via network 110. Server 202 may include a processor and/or stored software instructions 221 to accomplish the various methods described herein. Similarly, client 204 may include a processor and/or software instructions 222. The server 202 in FIG. 2 might correspond to encoder 102 of FIG. 1, while client 204 corresponds to media player 104. In general, however, the range of embodiments is not so limited, and the methods described herein may be used in the context of any communication based on TCP/IP, as is known in the art.

Figure 3:
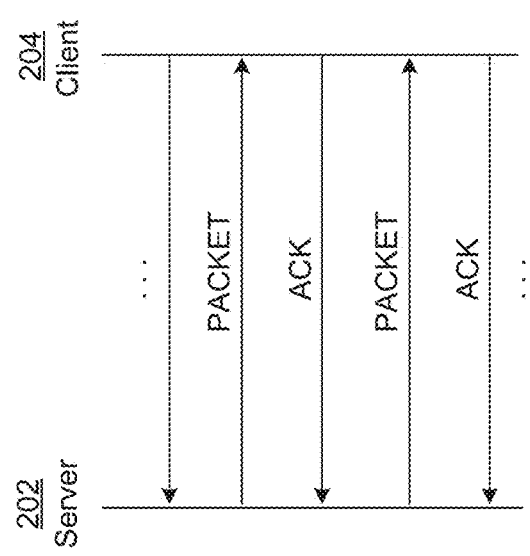
FIG. 3 is a diagram of a partial TCP/IP communication session in accordance with one embodiment.

The nature of data communication in accordance with the TCP/IP is well known in the art, and need not be described in detail herein. However, in the interest of clarity, it is illustrative to focus on the nature of ACK message in such an environment. That is, referring to FIG. 3, after a suitable synchronization process has taken place (through the trading of SYN, SYN-ACK, and ACK message), the exchange of information will take place as shown, in which server 202 sends a packet (at some bitrate) to client 204, after which client 202 responds with an ACK message. In general, this process proceeds during a session until all desired packets are substantially sent and received. The packets may, for example, comprise a set of packets corresponding to a streamed video file, though the invention is not so limited.

As is known, a packet sent by server 202 to client 204 will have a known size (i.e., number of bytes). Client's ACK response will then include a "sequence number" indicating how many bytes have been received, which is preferably the same as the size of the packet, but in some instances may be less than or greater than the packet size, as is known in the art.

During a TCP session each party (server 202 and client 204) maintains a 32-bit sequence number it uses to keep track of how much data it has sent. This sequence number is included on each transmitted packet, and acknowledged by the opposite host as an acknowledgement number to inform the sending host that the transmitted data was received successfully. When a host initiates a TCP session, its initial sequence number is effectively selected at random, e.g., any value between 0 and 4,294,967,295, inclusive.

Figure 4:
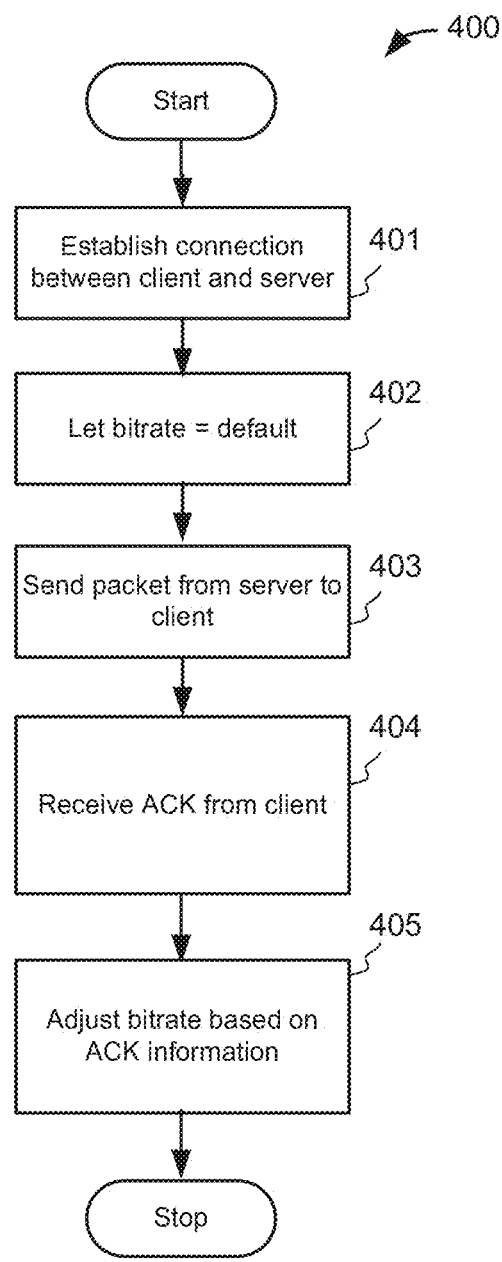
FIG. 4 is a flowchart of an exemplary process for optimizing bitrate in accordance with one embodiment.

Referring now to FIG. 4, a method 400 in accordance with various embodiments allows the system (e.g., the server 202) to estimate the optimal bitrate/bandwidth to be used for TCP/IP communication between server 202 and client 204.

First, in step 401, a connection (e.g., an Ethernet, WiFi, or other connection) is established between server 202 and client 204 using any suitable method known in the art. At this point, it is assumed that server 202 has selected a default bitrate (402). This default bitrate may be a bitrate that was previously found suitable in a particular context. That is, server 202 may have recently streamed video content to client 204 (or some other client 204) at 1 MB/s, and thus selects 1 MB/s as its default bit rate. This default bitrate may also be user configurable or otherwise specified.

Subsequently, at 403, server 202 begins to send packets to client 204 (e.g., in response to a request from client 204). For example, a user may manipulate a user interface of client 204 to request that a particular television series on server 202 be streamed.

As mentioned above in connection with FIG. 3, communication will generally proceed as a series of packets being sent by server 202, followed by an ACK message associated therewith (step 404). In step 405, then, the system (e.g., server 202) adjusts the bitrate based on information extracted from the ACK message. In one embodiment, for example, an estimated optimal bitrate is determined based on (1) the time between when a packet was sent and the corresponding ACK message was received ($\Delta t$), and (2) the size of the sent packet (S). For example, the estimated optimal bitrate may be specified as ($S/\Delta t$).

In one example, consider the case in which server 202 sends a 100-byte packet to client 204 at a known time. Subsequently—for example, 10 ms later—server 202 receives an ACK message indicating that 100 bytes were received. In such a case, the server 202 may then estimate that the optimal bitrate is 100 bytes/10 ms, or 80 Kbit/s (assuming 8-bit bytes), and adjust its bitrate accordingly. Subsequent estimates may similarly be derived to gradually converge to a substantially optimal bitrate, which may change over time based on various factors, as is known in the art.

In one embodiment, server 202 includes a transmit buffer as described above, and includes an alternate method of modifying bitrate based on the contents of the buffer. That is, the bitrate may be increased when the buffer begins to deplete (or some other criteria based on the buffer contents), and may then be decreased when the buffer begins to be filled with packets. In this embodiment, server 202 may select between a buffer-based determination of bitrate and an ACK-based determination of bitrate as described above. For example, server 202 may initially operate at a default bitrate (e.g., a bitrate equal to that used for a previous communication), and then operate for a certain length of time (or until certain criteria are met) using a buffer-based modification, and then operate using an ACK-based determination thereafter. The system may also use the buffer-based determination as a fallback in cases where the ACK-based determination is somehow unacceptable.

As noted above, the particular adjustments, transitions, transition parameters, timing parameters and other specific features of the preceding example are intended solely for purposes of illustration, and are not meant to be limiting. Other embodiments may provide parameter rate adjustment techniques and systems that vary significantly from those described herein, and that use any number of alternate or additional parameters and parameter values.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The invention claimed is:

1. A method of encoding a media stream comprising a plurality of packets, the method comprising:
establishing a data connection between a client device and a server;
determining an acknowledgement based determination for an optimal estimated bitrate comprising:
sending a first packet of the media stream from the server to the client device at a first bit rate;
receiving, at the server, a first acknowledgment signal from the client device responsive to receipt of the first packet;
determining a second bit rate based on the first acknowledgment signal, determining comprising:
estimating, at the server, the time required to receive the first acknowledgement signal from the client device;
extracting data from the first acknowledgment signal indicating a number of bytes received by the client device; and
calculating the second bit rate based on information of the time required to receive the first acknowledgement signal and the number of bytes received by the client device;
adjusting the first and second bitrates to an estimated optimal bitrate based on the information received for the first acknowledgement signal and the number of bytes received by the client device; and
determining a buffer-based determination of a third bitrate for an optimal third bitrate for a transmit buffer of the server storing buffer contents, comprising:
determining the third bit rate at the server based upon changes to the buffer contents of the transmit buffer;
modifying the third bitrate based on the contents of the transmit buffer wherein the bitrate is increased when the transmit buffer begins to deplete and decreased when the transmit buffer begins to fill to capacity; and
operating the server at multiple bitrates of the first bitrate, second bitrate and third bitrate wherein the third bitrate is for a certain length of time determined by the transmit buffer contents.

2. The method of claim 1, wherein data connection comprises a TCP/IP connection.

3. The method of claim 2, wherein the acknowledgement signal is a TCP/IP acknowledgement response.

4. The method of claim 1, wherein calculating comprises setting the second bit rate at a value substantially equal to a ratio of number of bytes received by the client device over the time required to receive the acknowledgment signal.

5. The method of claim 1, wherein the data comprises a sequence number contained within the acknowledgment response.

6. The method of claim 1, wherein the server comprises an encoder system.

7. The method of claim 6, wherein the encoder system comprises a placeshifting encoder system.

8. A media encoder system comprising:
a processor;
a memory component; and
computer-readable software instructions stored within the memory component and configured to cause the processor to:
establish a data connection between a client device and a server;
send a first packet of a media stream from to a client device over a network at a first bit rate;
receive, from the client device, a first acknowledgment signal responsive to receipt of the first packet;
determine a second bitrate based on a time required to receive the first acknowledgement signal from the client device, and data contained in the first acknowledgment signal indicative of the number of bytes received by the client device;
adjust the bitrate and the second bitrate to estimated optimal bitrates based on the time required to receive the first acknowledgement signal, and the number of bytes received by the client device for each of the bitrates;
determine a buffer-based determination of a third bitrate of a transmit buffer storing buffer at the server contents to:
determine the third bit rate at the server based upon changes to the buffer contents of the transmit buffer; and
modify the third bit rate, to another optimum estimated bitrate based on the transmit buffer contents to send packets of the media stream from the server to the client wherein the bitrate is increased when the transmit buffer begins to deplete and decreased when the transmit buffer begins to fill to capacity; and
operate the server at multiple bitrates of the first bitrate, second bitrate and third bitrate wherein the third bitrate is for a certain length of time determined by the transmit buffer contents.

9. The media encoder system of claim 8, wherein data connection comprises a TCP/IP connection.

10. The media encoder system of claim 9, wherein the acknowledgement signal is a TCP/IP acknowledgement response.

11. The media encoder system of claim 8, wherein the computer-readable software instructions further cause the processor to set the second bit rate at a value substantially equal to a ratio of the number of bytes received by the client device over the time required to receive the acknowledgment signal.

12. The media encoder system of claim 8, wherein the data comprises a sequence number contained within the acknowledgment response.

13. A media system comprising:
a client device; and
a media encoder system communicatively coupled to the client device via a data connection established over a network, the media encoder system configured to:
send a first packet of a media stream from to the client device at a first bit rate;
receive, from the client device, a first acknowledgment signal responsive to receipt of the first packet;
determine a second bit rate based on at least (i) a time required to receive the first acknowledgement signal from the client device and (ii) a sequence number contained in the first acknowledgment signal indicative of the number of bytes received by the client device;

determine a buffer-based determination of a third bitrate, wherein the server comprises a transmit buffer storing buffer contents to:

determine the third bit rate at the server based upon changes to the buffer contents of the transmit buffer, and modify the third bitrate based on the transmit buffer contents to send packets of a media stream from the server to the client wherein the third bitrate is increased when the transmit buffer begins to deplete and decreased when the transmit buffer begins to fill to capacity; and operate the server at multiple bitrates of the first bitrate, second bitrate and third bitrate wherein the third bitrate is for both a certain length of time determined by the transmit buffer contents and a fallback when the acknowledgement signal based determination of first and second bitrates is deemed unacceptable.

14. The media system of claim 13, wherein data connection comprises a TCP/IP connection.

15. The media system of claim 14, wherein the acknowledgement signal is a TCP/IP acknowledgement response.

16. The media system of claim 13, wherein the media encoder system is further configured to set the second bit rate at a value substantially equal to a ratio of the number of bytes received by the client device over the time required to receive the acknowledgment signal.

17. The media system of claim 13, wherein the data comprises a sequence number contained within the acknowledgment response.

* * * * *